Patented Oct. 27, 1925.

1,559,198

UNITED STATES PATENT OFFICE.

GEORGE H. STEVENS, OF NEWARK, NEW JERSEY.

VULCANIZING RUBBER.

No Drawing. Original application filed June 25, 1923, Serial No. 647,765. Divided and this application filed January 26, 1925. Serial No. 4,959.

*To all whom it may concern:*

Be it known that I, GEORGE H. STEVENS, a citizen of the United States, residing at Newark, in the county of Essex and State of New Jersey, have invented a certain new and useful Improvement in Vulcanizing Rubber, of which the following is a specification.

This invention relates to improvements in the use of organic nitrogenous substances that assist in or accelerate the vulcanization of rubber, and has for its object the utilization of new products that are mentioned for this purpose.

The use of organic nitrogenous compounds in the vulcanization of rubber is quite general and the products so used are technically termed "accelerators."

Whether such bodies act at catalysts, sulphur carriers, polymerizers, activators, or accelerators, is not the purpose of this specification to discuss, but I make use of the conventional term "accelerator" in my mention of them.

In experimental work with various nitrogenous organic compounds that I have used, to assist in the vulcanization of rubber, I have found that certain derivatives of carbodiimides form exceedingly valuable products for this purpose, and contrary to the general impression that they are not suitable use in rubber vulcanization.

In a previous patent application No 399,979 I have mentioned tetraphenylmelamine (tetraphenyltricarbodiimide), $$C_{27}H_{22}N_6 = C_3H_2(C_6H_5)_4N_6$$

a phenylated carbo- -diimide as an accelerator, and I have also found that other derivatives of carbodiimides are also very efficient aids to vulcanization, and especially where they are makedly basic in character.

An example of such a product is tetratolylmelamine, (tetratolyltricarbodiimide expressed by the following formula:

$$C_{31}H_{30}N_6 = C_3H_2(C_7H_7)_4N_6.$$

This product has a nitrogen content of over 17% and is comparatively stable during the period, and at the usual temperatures of vulcanization.

The product can be produced in various ways, but one manner is to unite two molecules of carbotolylimide $(C_8H_8N_2)$, with one molecule of carboditolylimide

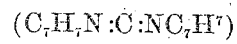

producing one molecule of tetratolyltricarbodiimide.

The same molecular percentages of the polymeric forms respectively, of these same carbo-tolylimides, also produce tetratolyltricarbodiimide.

This identifies the product then as a derivative of carbodiimide.

A similar product, results from the corresponding union of two molecules of carboxylilimide $(C_9H_{10}N_2)$ with one molecule of carbodixylilimide

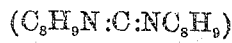

which then would be tetraxyliltricarbodiimide.

This body also proves a good accelerator but with a somewhat lower nitrogen content.

One method of obtaining carbo- (mono or di substituted) -imides, is by desulphurizing the corresponding substituted thioureas. Such desulphurizing is however subject to many modifications, depending on the presence of other products and so mixed products may result.

For instance—mustard oil is frequently present in disubstituted thiourea. If desulphurization of di- substituted thiourea takes place then in the presence of ammonia and mustard oil, a formation of the corresponding mono- substituted thiourea could take place, and a desulphurization of both thioureas would then yield the two corresponding carbo- substituted -imides.

These carbo- -imides then might be combined to tetra- substituted -tricarbodiimide, even though intermediate products form during such combination. There are also several other methods available for the production of these products.

Tetratolyltricarbodiimide seems to be of such stable character that it can be used even in a very impure state and still give excellent results. It is cryptocrystalline and so its isolation in a regular crystalline arm is effected with some difficulty, but it is entirely unnecessary that it be prepared of this degree of purity for use, so it can be used, either in its amorphus, or gummy state, or in mixed isomeric form, or with its related by-products and impurities present, without materially diminishing its usefulness.

Merely its degree of purity should be determined and then formulæ for its use would be based on such pure content.

This accelerator proves itself of unusual value in tire and tube compounds.

An example of a representative rubber compound and its cure, using tetratolyltricarbodiimide as an accelerator would be:

*For high tensile black.*

82 % Smoked sheets.
5 % Zinc oxide.
7 % Barytes.
5½% Sulphur.
0½% Tetratolyltricarbodiimide.

Cure:
44 minutes at 40 lbs. steam pressure, or:
20 minutes at 40 lbs. steam pressure for best aging.

An unusually high tensile results from the first of these cures.

*For friction stock.*

82 % Smoked sheets.
5 % Sulphur.
2 % Magnesium oxide.
10½% Zinc oxide.
0½% Tetratolyltricarbodiimide.

Cure:
35 minutes at 37 lbs. steam pressure.

*For red tube stock.*

69½% Smoked sheets.
18 % Golden or crimson antimony.
5 % Zinc oxide.
7 % Barytes.
0½% Tetratolyltricarbodiimide.

Many of the derivatives of carbodiimides are cryptocrystalline compounds with the amorphous appearance more frequently in evidence than the crystalline form, and so they are not readily separated from their accompanying compounds, that may be present due to their origin, or present as by-products of their formation.

Carbodiimide as well as the phenyl, tolyl, and xylil substitution products thereof may some of them assume the form of polymeric modifications.

The use of the term cryptocrystalline in this specification is intended to designate a body that is at times amorphous, either in fact or in appearance, and yet at other times is of a definite crystalline form. Hidden crystals would be a concise definition.

These cryptocrystalline carbodiimide derivatives seem to be generally of great stability at the temperatures required for vulcanization, have a fairly high nitrogen content, and appear not to be very reactive with their own by-products during use.

Another characteristic of them is, that frequently they are higher melting bodies, resulting from the decomposition of lower melting bodies, which in acceleration means, the original accelerator of lower melting point is progressively decomposed under vulcanization into the higher melting accelerator, and in theory, eventually the lower melting accelerator becomes more or less exhausted and when the cure is completed, the higher melting accelerating material then present, inhibits the activity of further vulcanization in the cold, or as expressed in technical parlance, the resulting rubber product thus has, "better aging qualities," or "stands aging better."

My invention then consists in utilizing, in rubber vulcanization, the bodies herein mentioned and which appear to have superior qualities to many of the compounding ingredients used heretofore in compounding and vulcanizing rubber.

While I have described my invention in detail, and stated the manner in which the products mentioned may be prepared and used, it is to be understood that I do not mean to be limited in this specification to the use of the particular ingredients mentioned as examples, or in any way, except by the claims as set forth and annexed herewith.

It is further to be understood that my invention is not to be construed as dependent on the accuracy or soundness of any of the theories herein expressed, or on the correctness of the structural formulas used to designate the products.

Having now described my invention and having shown in what manner the same may be utilized, what I claim as new, and desire to secure by Letters Patent is:

1. A process of vulcanizing rubber which consists in, incorporating a vulcanizing agent with compounded rubber, then under heat, causing the formation of tetraphenyltricarbodiimide within the rubber mixture while effecting vulcanization.

2. In the vulcanization of rubber the combination of: sulphur or a suitable compound of sulphur,—as a vulcanizing agent; tetraphenyltricarbodiimide either by itself or in combination with other bodies,—as an aid to vulcanization; raw or compounded rubber,—as the product to be vulcanized; and means applied to these materials when united, to effect vulcanization.

3. A process of vulcanizing rubber which consists in, incorporating into rubber an accelerator resulting from a combination of desulphurized mono- and di-phenylthiourea, then heating the resultant rubber mixture with a vulcanizing agent to effect vulcanization.

4. A process of vulcanizing rubber which consists in, incorporating into rubber an accelerator resulting from a diphenylthiourea that has been desulphurized in the presence of phenyl mustard oil and ammonia, then heating the resultant rubber mixture with a vulcanizing agent to effect vulcanization.

5. A process of vulcanizing rubber which consists in, incorporating into rubber an accelerator resulting from a combination of carbodiphenylimide and carbomonophenylimide, or of their polymeric modifications respectively, then heating the resultant rubber mixture with a vulcanizing agent to effect vulcanization.

6. A vulcanized compound, containing rubber or similar material, a vulcanizing agent, and tetraphenyltricarbodiimide.

7. A vulcanized compound, containing rubber or similar material, a vulcanizing agent, and a combination of desulphurized mono- and di- phenylthiourea.

8. A vulcanized compound, containing rubber or similar material, a vulcanizing agent, and a diphenylthiourea that has been desulphurized in the presence of phenyl mustard oil and ammonia.

9. A vulcanized compound, containing rubber or similar material, a vulcanizing agent, and a combination of carbomono- and carbodi- phenylimide, or of their polymeric modifications respectively.

GEORGE H. STEVENS.